United States Patent Office 2,868,978
Patented Jan. 13, 1959

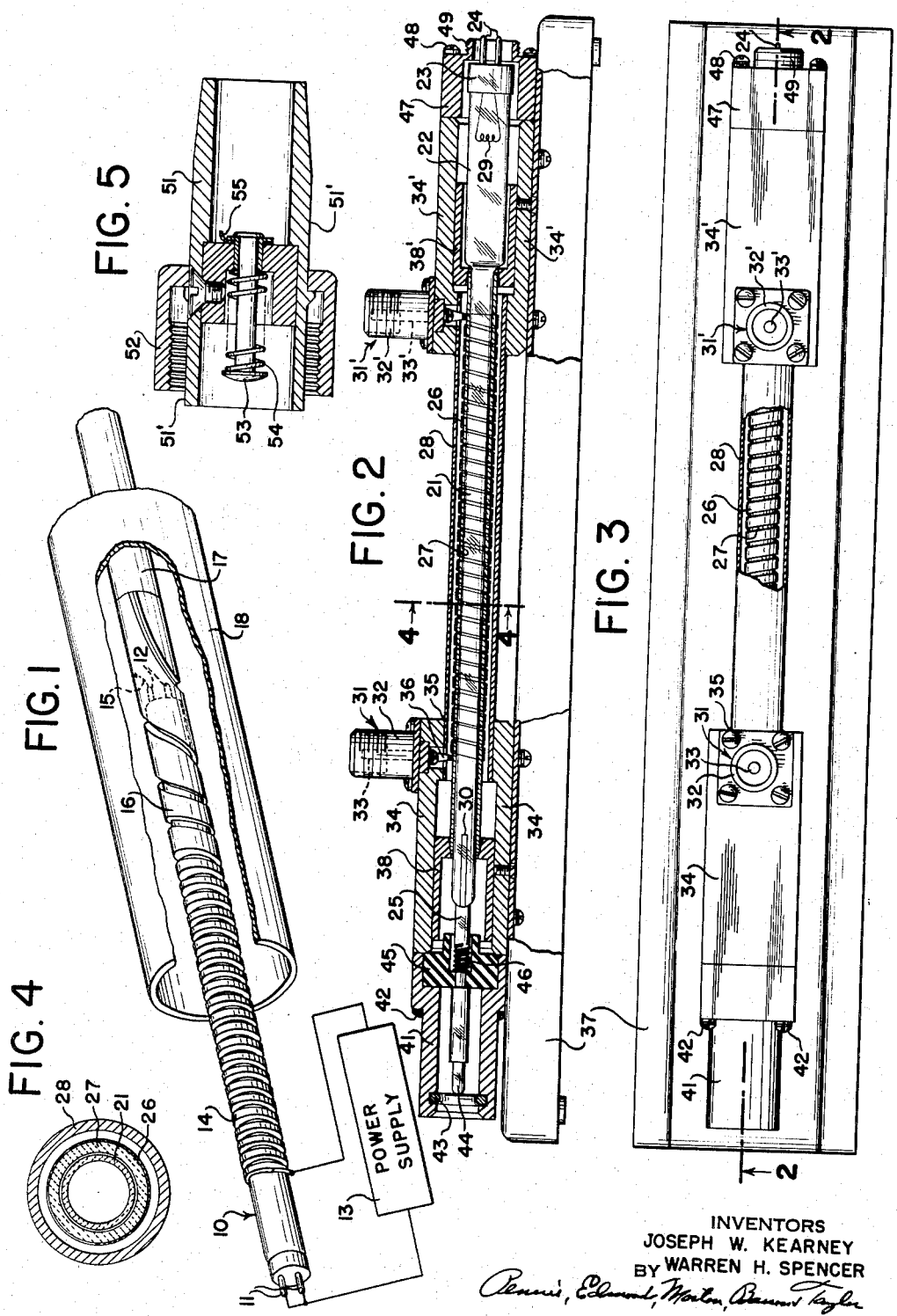

2,868,978
TEST APPARATUS

Joseph W. Kearney, East Williston, N. Y., and Warren H. Spencer, Minneapolis, Minn., assignors, by mesne assignments, to Cutler-Hammer, Inc., Milwaukee, Wis., a corporation of Delaware Application September 4, 1956, Serial No. 607,834

8 Claims. (Cl. 250—36)

This invention relates to a broadband microwave noise generator.

Noise generators have been found very useful in microwave test equipment, particularly in making measurements on receiver noise. In microwave receivers, the amount of noise present is often a limiting factor, and great care is usually taken to reduce the noise as much as possible. One way of determining the residual receiver noise is by comparing it with a known amount of noise. Thus, noise generators have become important in connection with both the design of microwave receivers and in the testing thereof.

Several types of noise sources are known, but the gas discharge tube has been found to have many advantages. Such tubes commonly have two electrodes spaced apart in a suitable envelope, usually glass, filled with a selected gas or combination of gases. Argon, neon and mixtures of these gases with mercury vapor have been employed with success, and other gases or gas mixtures can be employed if desired. When a voltage is applied to the two electrodes, a gas discharge is established and it is found that this discharge generates noise quite uniformly over a wide frequency range extending from relatively low frequencies up to extremely high frequencies. Different gases give different amounts of noise under otherwise similar conditions, and the relative advantages and disadvantages of various gases and gas mixtures are now fairly well known.

Although the gas discharge tube in itself emits noise over a wide frequency spectrum, serious difficulties arise in attempting to couple the emitted noise to a transmission line efficiently and over a wide band. Heretofore noise generators have been made in which the gas discharge tube is inserted at an angle in a waveguide. While such a noise generator can be employed for many purposes, it has limitations which restrict its usefulness. Waveguides have a low frequency cutoff determined largely by the cross-sectional size and shape, so that waveguide noise generators become unduly cumbersome at lower frequencies and are not commonly used below about 1000 megacycles. Also, waveguides commonly transmit energy only over a frequency range of the order of 2 to 1 before higher modes of propagation become possible, and the actual useful frequency range is somewhat less than this for noise generators. In addition, for many applications the connection of a waveguide noise generator to the apparatus to be measured is inconvenient or expensive.

It is a primary object of the present invention to provide a noise generator capable of operating satisfactorily over a frequency range considerably greater than that practicable with waveguide, and to lower frequencies.

Coaxial line has a frequency range which extends from D.-C. far into the microwave region and thus, as a transmission line, is not subject to some of the limitations of waveguide. While waveguide is commonly preferred to coaxial line at frequencies above about 3000 megacycles, due in part to lower losses, coaxial line can be used above 3000 megacycles where the losses are not a serious drawback. However, in order to use coaxial line, some means must be provided for effectively coupling the noise from the gas discharge into the coaxial line.

In accordance with the present invention, the coupling of noise from a gas discharge tube noise source to a coaxial line is obtained by the use of a helical transmission line which encircles the gas discharge tube in closely adjacent relationship to provide tight coupling to the gas discharge. To helical line extends along the gas discharge tube a sufficient length so that the gradual dissipative load provided by the gas discharge prevents reflection of energy from one end of the line to the other. Thus, from it output end, the helical line appears as though it were terminated at its other end of a load equal to its characteristics impedance, and standing waves are not set up. Then, a helical-to-coaxial transmission line transition is provided at the ouput end of the helical line. The overall result is that tight coupling from the gas discharge to the coaxial line is obtained, with a good impedance match over a wide frequency range. Helical-to-coaxial transitions may be provided at both ends of the helical line if desired.

Suitable transitions for coupling a helical transmission line to a coaxial transmission line are known in the art and may be employed in the noise generator of the invention. One form is a non-uniform helix wherein the pitch gradually increases from the uniform helical line to the coaxial line. This is often called the "Lund" transition. Another preferred type is illustrated in the specific embodiments described hereinafter.

Other features of the invention will in part be pointed out and in part be obvious from the following description of specific embodiments thereof.

In the drawings:

Fig. 1 illustrates a single-ended noise source generator employing a non-uniform helical transition;

Fig. 2 is a longitudinal view, mostly in cross-section, of a preferred form of noise generator;

Fig. 3 is a longitudinal view, partly in cross-section, of the noise generator of Fig. 2, but at right angles thereto;

Fig. 4 is a cross-section taken along the line 4—4 of Fig. 2; and

Fig. 5 is a longitudinal cross-section of a suitable connector at the base end of the discharge tube of Fig. 2.

Referring to Fig. 1, an elongated gas discharge tube noise source is shown at 10, comprising a thin-walled tubular glass envelope with terminals 11 and 12 at opposite ends thereof. The tube is filled with a suitable gas, such as argon, and electrodes at each end of the tube are electrically connected to terminals 11 and 12. The tube is energized from a D.-C. power supply 13 by connecting one lead of the power supply to terminals 11 and the other lead to the helix 14 which, in turn, is connected to terminals 12 by the wire 15.

Helix 14 is a conductive wire or strip wound around the envelope of the discharge tube 10 and extending along the tube a length which is large compared to the diameter of the helix. At one end of helix 14 a helical-to-coaxial transmission line transition is provided in the form of a non-uniform helix 16 whose pitch gradually increases until it becomes a rod or tube 17 which forms the central conductor of a conventional coaxial line. The conductive tube 18 forms the outer conductor of the coaxial line and advantageously extends over the helical line at least partway, so as to facilitate obtaining a good impedance match.

Since the gas discharge tube 10 is in closely adjacent relationship with the helix 14, tight coupling between the gas discharge and the helix is obtained. Thus, the noise generated by the gas discharge is efficiently coupled into the helix. Also, since the helix 14 extends a considerable distance along the gas discharge tube, the gaseous discharge provides a gradual dissipative loss along the helix. In this manner a good impedance match can be achieved and the total excess noise power from the discharge is made available at the end of the helix. The non-uniform helical section 16 then provides a gradual transition from the impedance of the helix to that of the coaxial line 17, 18 so that a good overall impedance match is obtained.

As illustrated, the noise generator of Fig. 1 is single-ended and the noise coupled to the coaxial line 17, 18 can be used in any desired manner for measuring purposes, etc. In a commercial version, a suitable coaxial cable connector may be provided for ready connection to other equipment. Since there is high attenuation between the point on the helix where the power supply is connected and the output end of the generator, the generated noise is not short-circuited by the power supply.

Figs. 2, 3 and 4 illustrate a preferred embodiment which is double-ended so as to permit ready insertion in a coaxial line. When the discharge tube is unenergized, the structure is such as to introduce very little loss so that the noise generator can be left permanently connected in a system if desired. Then, by energizing the gas discharge tube a source of noise is obtained for test purposes, and by de-energizing the tube, the equipment with which it is associated may function in its normal manner substantially unimpaired by the presence of the noise generator structure.

In Figs. 2, 3 and 4 a gas discharge tube noise source has a slender elongated section 21, and a section of somewhat larger diameter 22 terminating in a base 23 supporting pins 24. The pins are connected to opposite ends of a filament 29 serving as one electrode of the gas discharge tube. An electrode 30 at the other end of the tube is connected to a conductive terminal 25 so that the gas discharge can be established by providing a suitable voltage between terminal 25 and pins 24.

The structure and energization of such gas discharge tubes are well known in the art and need not be described in detail. If desired, heating current can be supplied to filament 29 and the operating voltage applied. Or, as is at present preferred, the discharge tube can be operated as a cold cathode tube by connecting terminals 24 together, applying the operating voltage between terminals 24 and 25, and momentarily applying a high-voltage between terminals 24 and 25 to initiate the discharge.

In this embodiment the conductive helix 26 is formed on a thin-walled tube 27 of insulating material. It has been found very satisfactory to print the helix 26 on a thin-walled glass cylinder 27, since such a procedure permits obtaining a very uniform helix which is closely adjacent the gas discharge. The conductive helix 26 may be printed or otherwise formed directly on the envelope of the gas discharge tube, if desired. However, since the gas discharge tube will eventually require replacement, it is considered advantageous to form the helix on a separate thin-walled cylinder closely surrounding the gas discharge tube, so that less expensive replacement tubes can be employed.

At each end of the helix 26 a helical-to-coaxial transmission line transition is provided. In this embodiment a simple transition is employed. The helix 26 is surrounded in spaced relationship by a conductive cylinder or outer shield 28 which is designed to make the characteristic impedance of the helical section approximately equal to the characteristic impedance of the coaxial line with which the noise generator is to be used. Then, coaxial line connectors 31, 31' are provided at each end of the helical line. Connector 31 comprises an outer conductor 32 and a central conductor 33 insulatedly supported therein. The connector is attached by machine screws or otherwise to a metallic housing section 34 of the noise generator which, in turn, is connected to the outer shield 28 at 35. Inner conductor 33 is connected through a finger 36 to one end of the helix 26. Advantageously the finger is tangent to the helix at the point of contact. Thus, the lower end of finger 36 is bent to be tangent to the helix and spring-presses against it. The arrangement for connector 31' is similar.

The supporting structure for the noise generator includes a base 37 to which housings 34, 34' are attached. Housings 34, 34' are bored to receive supporting members 38, 38', which in turn are bored to receive and support the helix tube 27.

A connector housing 41 is secured to housing 34 by screws 42, and contains at the outer end a garter spring 43 and a central pin 44 to receive a plug from the power supply. Pin 44 is mounted in connector housing 41 by an insulating block 45. A compression spring 46 is provided to hold the tube in position when it has been inserted, and to insure good contact between the tube terminal 25 and pin 44.

A connector housing 47 for the base of the gas discharge tube is attached to housing 34' by machine screws 48. Connector housing 47 is provided with a threaded ring 49 so that a connector from the power supply can be attached. The gas discharge tube can be inserted by removing connector housing 47.

Provision could be made in connector housing 47 to hold the gas discharge tube in place and force it against compression spring 46, as by a suitable spring, if desired. However, in the present embodiment, the connector from the power supply is relied upon for this purpose.

A suitable connector is shown in Fig. 5. A tube 51 of conductive material has an outer diameter 51' adapted to fit inside the threaded ring 49 (Fig. 2) and is provided with a threaded collar 52 adapted to be screwed onto threaded ring 49 to hold the connector in place. Supported within tube 51 is a plunger 53 which is urged to its forward position by compression spring 54. A solder lug 55 is provided for facilitating attachment to a power supply cable. When the connector of Fig. 5 is attached to the noise generator of Fig. 2, the plunger 53 short circuits pins 24 and also spring-presses the gas discharge tube to the left, so that the tube is held in position against spring 46.

In this embodiment, the filament 29 serves as a cold cathode and may be held at ground potential. Thus, the connector of Fig. 5 can be made of conductive material throughout, and the exposed outer portions of the generator and the negative side of the power supply kept at ground potential. Electrode 30 serves as an anode and the positive side of the power supply is connected to pin 44 through a suitable plug and cable.

With one particular argon-filled tube, the operating voltage was about 80 volts D.-C. across the discharge, and the discharge was initiated by a high voltage pulse of the order of 2000–3000 volts.

In using the noise generator, one connector 31, 31' may be connected directly to the input of the device under test if the impedances are matching, otherwise through an appropriate transformer. The other connector preferably should also be terminated in its characteristic impedance. For example, if the noise generator is designed with 50 ohm connectors, it may be inserted in a line of the device under test which is 50 ohms impedance in either direction. If the impedance of the device under test differs from 50 ohms, suitable matching transformers may be employed. If it is desired to connect only one end of the noise generator to the equipment under test, the other end may be terminated by a 50-ohm impedance.

As an aid to the ready practice of the invention, certain relationships which have been found to be helpful in designing the noise generator for a particular frequency range will be mentioned, it being understood that the invention is not restricted thereto.

The upper frequency limit is determined largely by the equivalent electrical length of one turn of the helix and by the uniformity with which the helix can be fabricated. For operation in the fundamental mode, the upper frequency limit is that at which the distance around one turn of the helix is about a half wavelength. Thus, by making the helix radius smaller, the upper frequency limited may be increased.

The lower frequency limit is determined largely by the length of a suitable helix that can be applied to a given gas discharge tube. In general, the larger the number of turns of the helix, the lower the low frequency limit. One useful guide is to make the total number of turns of the helix of the order of twice the ratio of the desired upper to lower operating frequencies. Another useful guide is to make the extended length of the helix, that is, the length of the conductor of which the helix is wound, at least one-half wavelength at the lowest operating frequency.

Generally, it is desirable to make the length of the helix large compared to the diameter thereof so that the discharge tube introduces a gradual dissipative loss from the output back along the tube. When this is done, the gas discharge itself prevents reflection of waves which would give rise to standing waves in the external circuit.

When it is desired to make the impedance of the helical line approximately equal to that of the connecting coaxial lines, as is the case of the embodiments of Figs. 2, 3 and 4, the actual helix impedance is found to involve the factors of frequency, helix radius, ratio of the radius of the outer shield 28 to the helix radius, and the number of helix turns per unit length. The relationships between these factors are known in the art and need not be set forth in detail. For practical purposes, a factor M has been found useful, which is:

$$M = \frac{4\pi^2 a^2 T f_{av}}{3 \times 10^{10}}$$

where $a$=helix radius in centimeters
$f_{av}$=the average operating frequency based on the selected upper and lower frequencies
$T$=helix turns per centimeter In general, it has been found desirable to make this factor M lie in the region of approximately 1 to 2, so as to obtain the least amount of impedance variation over the operating frequency range. If the helix radius $a$ is determined for the upper frequency limit, as set forth above, making the factor M equal to 1 to 2 gives the number of helix turns per centimeter.

When the helix design has been determined, a suitable gas discharge tube can be selected, or the design modified appropriately to permit the use of a commercially available tube. Finally, the ratio of outer shield to helix radius can be selected to give the desired impedance at the average operating frequency.

It has been found advantageous to design the noise generator so that the helix is substantially isolated from the energizing circuitry of the gas discharge tube. This is accomplished in the embodiment of Fig. 2 by making the cavities enclosed by housings 34 and 34' of sufficiently small diameter and sufficiently long to serve as waveguides having a cutoff frequency which is higher than the highest intended operating frequency of the noise generator. The principles for the design of such waveguide sections are well-known in the art and need not be set forth here. At the base end of the discharge tube the internal bore of support 38' and housing 34' may readily be made sufficiently long with respect to its diameter to provide adequate attenuation between the end of the helix and the filament 29 and beyond. At the other end of the discharge tube, the rod-like anode 30 and terminal 25 together with the surrounding support 38 may be considered to be a short length of coaxial line which could transmit microwave frequencies. Thus, it is advisable to make the axial distance between the end of anode 30 and the helix contact finger 36 sufficiently long with respect to the bore diameter of housing 34 to provide adequate attenuation at anode 30.

As a further aid to the ready practice of the invention, certain constructional details of the embodiment of Figs. 2–4 may be given, it being understood that these details are not given by way of limitation. The helix 26 consisted of 30 turns uniformly spaced over a length of 6 inches giving 5 turns per inch. The helix conductor was approximately 0.167" wide and 1 to 2 thousandths of an inch thick, and was silver-printed and fired on the outside of a glass tube 27. Tube 27 was approximately 7¾" long, 0.46" outside diameter and 0.395" inside diameter. The ratio of the radius of the outer shield 28 to the radius of the helix was approximately 1.15.

The insertion loss with the discharge tube off was negligible at 200 mc. and gradually increased to about 3 db at 2600 mc. With the discharge tube on, the insertion loss was greater than 10 db at 200 mc. and greater than 25 db at frequencies over about 1000 mc. When a matching termination having an SWR less than 1.1 was connected to one connector 31, 31', the voltage SWR at the other connector was about 1.15 average with the discharge tube on, and 1.25 average with the tube off, over the frequency range 200–2600 mc. Operation at higher frequencies was possible with somewhat greater SWR.

By employing a longer discharge tube and longer helix, operation at frequencies below 200 megacycles is possible. With a discharge tube and helix of sufficiently small diameter, operation at frequencies considerably above 3000 megacycles is possible.

The invention has been described in connection with two specific embodiments, and many constructional features have been given. It will be understood, however, that many alternatives are possible within the spirit and scope of the invention, as meets the requirements of a particular application.

We claim:

1. A broadband microwave noise generator which comprises a gas discharge tube noise source having a slender elongated section of substantially uniform diameter, an ungrounded single conductor helix of uniform diameter and turn spacing forming a helical transmission line and positioned to encircle said slender elongated section in closely adjacent relationship and extending therealong a length large compared to the diameter thereof, the distance around one turn of the helix being not greater than approximately a half wavelength at the highest frequency in the operating range of the noise generator and the extended length of the conductor forming the helix being at least approximately a half wavelength at the lowest frequency in the said operating range, whereby tight coupling and substantial impedance match between the gas discharge in said tube and said helical line may be obtained, and a helical-to-coaxial transmission line transition at one end of said helical line.

2. A broadband microwave noise generator which comprises an elongated gas discharge tube noise source, a helical transmission line encircling said tube in closely adjacent relationship, and a pair of helical-to-coaxial transmission line transitions at spaced points of said helical transmission line, the spacing between said points being large compared to the diameter of said helical line, said pair of transitions and helical transmission line providing a transmission channel of low loss when the gas discharge tube is unenergized.

3. A broadband microwave noise generator which comprises an elongated gas discharge tube noise source, a helical transmission line including an ungrounded single conductor helix encircling said discharge tube in closely adjacent relationship and an outer conductive cylinder encircling said helix and substantially coaxial therewith, the distance around one turn of said helix being not greater than approximately a half wavelength at the highest frequency in the operating range of the noise generator and the extended length of the conductor forming the helix being at least approximately a half wavelength at the lowest frequency in the said operating range, and a coaxial line section at one end of said helical transmission line, said coaxial line section having a central conductor connected to said helix and an outer conductor connected to said outer cylinder, said helix and outer cylinder being correlated to provide a characteristic impedance which substantially matches the characteristic impedance of said coaxial line section.

4. A broadband microwave noise generator which comprises a gas discharge tube noise source having a slender elongated section of substantially uniform diameter, a helical transmission line including a conductive helix encircling said slender elongated section in closely adjacent relationship and an outer conductive shield encircling said helix, and a pair of low loss coaxial line sections having respective central conductors connected to said helix at spaced points thereof and respective outer conductors connected to said outer shield, the spacing between said points being large compared to the diameter of the helix, said helix and outer shield being correlated to provide a characteristic impedance which substantially matches the characteristic impedance of said coaxial line sections.

5. A broadband microwave noise generator which comprises a gas discharge tube noise source having a slender elongated section of substantially uniform diameter, a helical transmission line including a conductive helix encircling said slender elongated section in closely adjacent relationship and an outer conductive shield encircling said helix, the length of said helix being large compared to the diameter thereof, and a pair of low loss coaxial line sections extending laterally from said helical transmission line adjacent the ends of said helix and having respective central conductors connected to respective ends of the helix and respective outer conductors connected to said outer shield, said helix and outer shield being correlated to provide a characteristic impedance which substantially matches the characteristic impedance of said coaxial line sections.

6. A broadband microwave noise generator which comprises an elongated gas discharge tube noise source having electrodes near opposite ends thereof, a helical transmission line encircling said tube in closely adjacent relationship, a helical-to-coaxial transmission line transition at one end of said helical line, connections for supplying operating voltage from a power supply to said electrodes, and microwave attenuating means between at least one of said connections and said one end of the helical line.

7. A broadband microwave noise generator which comprises a gas discharge tube noise source having a slender elongated section of substantially uniform diameter, said gas discharge tube having electrodes near opposite ends thereof, a helical transmission line including a conductive helix encircling said slender elongated section in closely adjacent relationship and an outer conductive shield encircling said helix, the length of said helix being large compared to the diameter thereof and the separation of said electrodes being greater than the length of the helix to provide spacing in the axial direction between each end of the helix and the adjacent electrode, a pair of low loss coaxial line sections having respective central conductors connected to respective ends of said helix and respective outer conductors connected to said outer shield, said helix and outer shield being correlated to provide a characteristic impedance which substantially matches the characteristic impedance of said coaxial line sections, and conductive walls encircling said discharge tube between the ends of said helix and the adjacent electrodes, respectively, the length and cross section of said walls being proportioned to provide waveguide sections beyond cutoff at the operating frequencies of the noise generator and thereby provide substantial attenuation between said helix and said electrodes.

8. A broadband microwave noise generator which comprises an elongated gas discharge tube noise source, an ungrounded single conductor helix forming a helical transmission line and positioned to encircle said tube in closely adjacent relationship, said helix being of uniform diameter and turn spacing and having a length large compared to the diameter thereof, the distance around one turn of the helix being not greater than approximately a half wavelength at the highest frequency in the operating range of the noise generator and the extended length of the conductor forming the helix being at least approximately a half wavelength at the lowest frequency in the said operating range, and a helical-to-coaxial transmission line transition at one end of said helical line.

References Cited in the file of this patent
UNITED STATES PATENTS

| | | |
|---|---|---|
| 2,463,368 | Finke | Mar. 1, 1949 |
| 2,645,718 | Keizer | July 14, 1953 |
| 2,745,013 | Hines | May 8, 1956 |